US005937734A

United States Patent [19]

Stiefel et al.

[11] Patent Number: 5,937,734

[45] Date of Patent: Aug. 17, 1999

[54] RECIPROCATING PUMP

[75] Inventors: Hans-Peter Stiefel, Ditzingen; Karl Gmelin, Flein, both of Germany

[73] Assignee: Robert Bosch GmbH, Stuttgart, Germany

[21] Appl. No.: 09/051,884

[22] PCT Filed: May 28, 1997

[86] PCT No.: PCT/DE97/01076

§ 371 Date: Apr. 23, 1998

§ 102(e) Date: Apr. 23, 1998

[87] PCT Pub. No.: WO98/09075

PCT Pub. Date: Mar. 5, 1998

[30] Foreign Application Priority Data

Aug. 30, 1996 [DE] Germany ........................ 196 35 164.2

[51] Int. Cl.[6] .................................. F16J 1/10; F04B 1/04

[52] U.S. Cl. ............................ 92/129; 417/273; 417/470

[58] Field of Search ............................ 92/129, 153, 155; 417/273, 470

[56] References Cited

U.S. PATENT DOCUMENTS

| | | | |
|---|---|---|---|
| 4,068,982 | 1/1978 | Quarve | 417/387 |
| 5,178,524 | 1/1993 | Nicol | 92/129 X |
| 5,364,234 | 11/1994 | Eickmann | 417/273 |
| 5,564,908 | 10/1996 | Phillips et al. | 417/273 |
| 5,775,203 | 7/1998 | Osborn et al. | 417/470 X |
| 5,839,349 | 11/1998 | Volz | 417/273 X |

FOREIGN PATENT DOCUMENTS

| | | |
|---|---|---|
| 3921635 | 1/1990 | Germany . |
| 4411979 | 10/1995 | Germany . |
| 4419927 | 12/1995 | Germany . |
| 4441817 | 5/1996 | Germany . |

*Primary Examiner*—Hoang Nguyen
*Attorney, Agent, or Firm*—Edwin E. Greigg; Ronald E. Greigg

[57] ABSTRACT

The device relates to a piston pump, in particular a high pressure pump for a fuel injection device of an internal combustion engine, with at least one piston that is supported so that the piston can slide in a piston guide provided in a housing. A drive shaft is supported in the housing (10) on which drive shaft a crank element is provided. A stroke ring is supported in rotary fashion on the crank element and the piston can be acted upon by the drive shaft by way of this stroke ring. In order to prevent high lateral forces on the piston, the piston is supported on the non-rotating stroke ring with a sliding surface disposed on it against an associated slide bearing surface, wherein lubrication grooves are let into the slide bearing surface, crosswise to the relative motion between the piston and the stroke ring.

20 Claims, 3 Drawing Sheets

RECIPROCATING PUMP

The invention relates to a piston pump, in particular a high pressure pump for a fuel injection device of an internal combustion engine.

PRIOR ART

In a known piston pump of this kind (DE 44 19 927 A1), three pistons disposed in the shape of a star are driven by means of an eccentric pin which is provided on a free end of a drive shaft that is provided in a cantilevered fashion in the pump housing. A cup-shaped part is supported so that it can rotate on the eccentric pin by means of a roller bearing which is lubricated through a lubrication line provided in the drive shaft. In lieu of the roller bearing, a slide bearing can also be used, which can also be embodied as a dry bearing with a suitable pairing of materials.

The transfer of force from the eccentric pin to the pistons is carried out by means of flexible transfer elements that are fastened to the pistons and to the cup-shaped part, which is supported on the drive shaft and does not rotate, so that no sliding friction occurs between the pistons and their actuating element, i.e. the cup-shaped part, or the transfer elements.

The article "Hydraulik in Theorie und Praxis. Von Bosch." [Bosch Theoretical and Applied Hydraulics] W. G ötz, 1983, Robert Bosch GmbH, Stuttgart, has disclosed a radial piston pump with external piston support in which during the operation of the pump, a cylinder star is rotated by a drive shaft via a coupling. The cylinder star has a number of cylinders in which pistons are disposed so they can be moved radially. The cylinder star with the pistons is circumferentially enclosed by an essentially non-rotating stroke ring and the pistons are supported with their radial outer ends via slide shoes against the inner circumferential surface of this stroke ring and this surface is used as a slide bearing surface.

In order to achieve a hydrostatic bearing relief of the slide bearings constituted by the stroke ring and the slide shoes, in the middle of its sliding surface, each slide shoe has a recess which communicates with the respective cylinder chamber. In the direction of the sliding motion in addition to the recess, grooves are also provided in the sliding surfaces of the slide shoes and these grooves extend crosswise to the movement direction.

When this known pump operates, the slide shoes continuously move in one direction along the inner circumference surface of the stroke ring.

In a known radial piston pump (DE 42 41 827 A1) with internal piston support, an eccentric part is non-rotatably disposed on a drive shaft and the outer circumference surface of this eccentric part acts as a slide bearing surface for the pistons supported on it. In this known pump, the relative movement between the sliding surface on the piston and the slide bearing surface on the eccentric part also continuously occurs in the same direction.

ADVANTAGES OF THE INVENTION

The piston pump has the advantage over the prior art that high lateral forces on the piston, which would have to be absorbed by the piston guide, are prevented. In particular, lateral forces that act on one side, like the ones that occur in conventional radial piston pumps, are prevented without having to provide costly actuating elements between the stroke ring and the piston.

A particular advantage of the invention is comprised in that the medium to be delivered by the pump travels into all regions between the slide bearing surface on the stroke ring and the slide shoe, although the stroke ring only executes an oscillating sliding motion in relation to the slide shoe and the movement length of this oscillating motion is less than the length of the sliding surface on the slide shoe in the movement direction.

It is particularly advantageous to use a stroke ring made of plastic, in particular polyimide or PEEK, since this produces particularly low-friction support surfaces, so that additional bearing elements between the stroke ring and the crank element as well as friction improving measures on the sliding surface disposed on the piston are no longer necessary.

The use of coatings, in particular carbon coatings on the sliding surface disposed on the piston, as well as on the circumference surface of the piston running in the piston guide improves the corresponding surface hardness and the abrasion resistance so that so-called seizings between the surfaces that are sliding against one another can be prevented.

Advantageous improvements and updates of the piston pump are possible by means of the measures taken.

BRIEF DESCRIPTION OF THE DRAWINGS

Exemplary embodiments of the invention are shown in simplified fashion in the drawings and will be described in more detail in the description that follows.

Parts that correspond with one another are provided with the same reference numerals in the different Figs. of the drawings.

DESCRIPTION OF THE EXEMPLARY EMBODIMENTS

Figure 1:
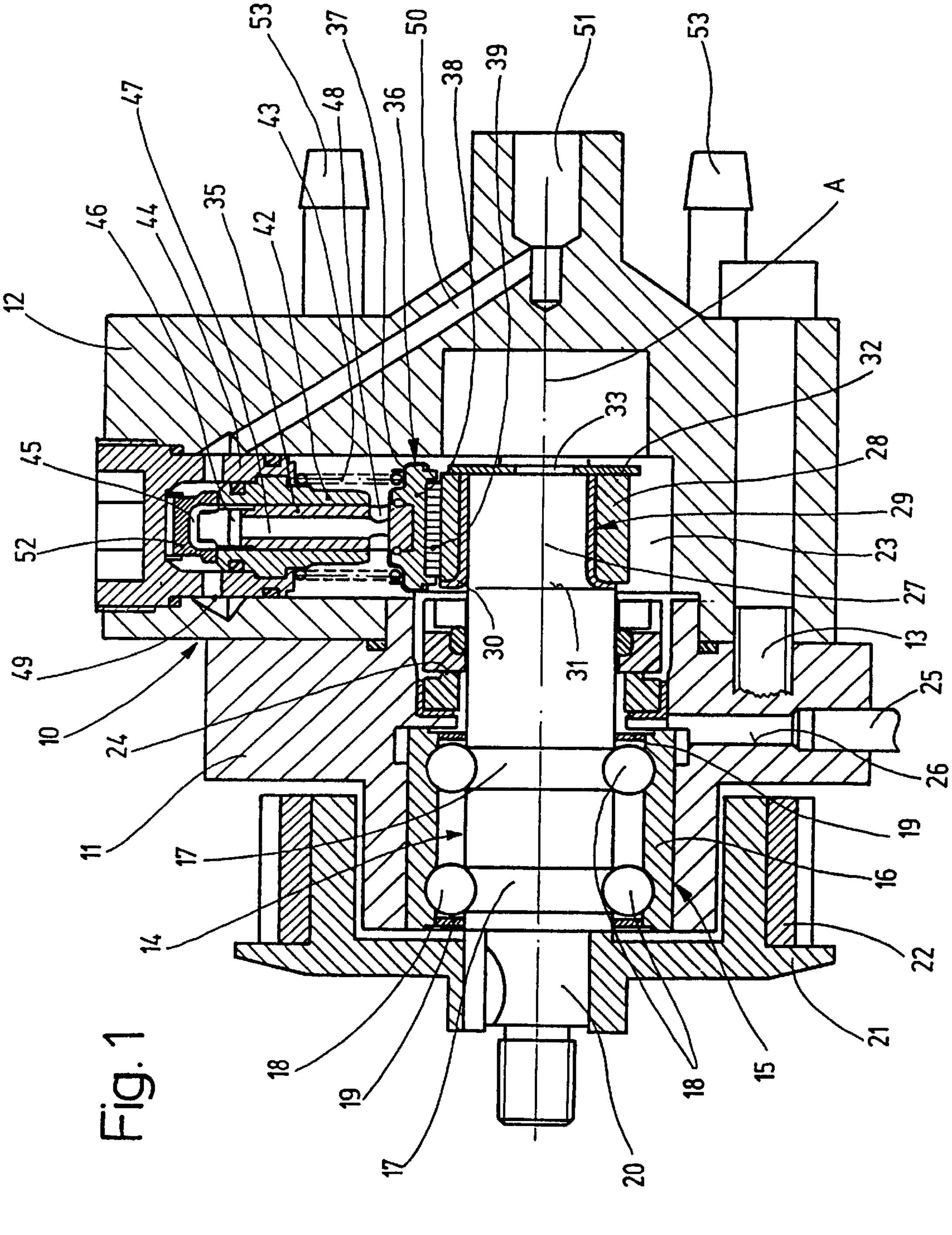
FIG. 1 is a longitudinal section through a piston pump according to the invention.
Figure 2:
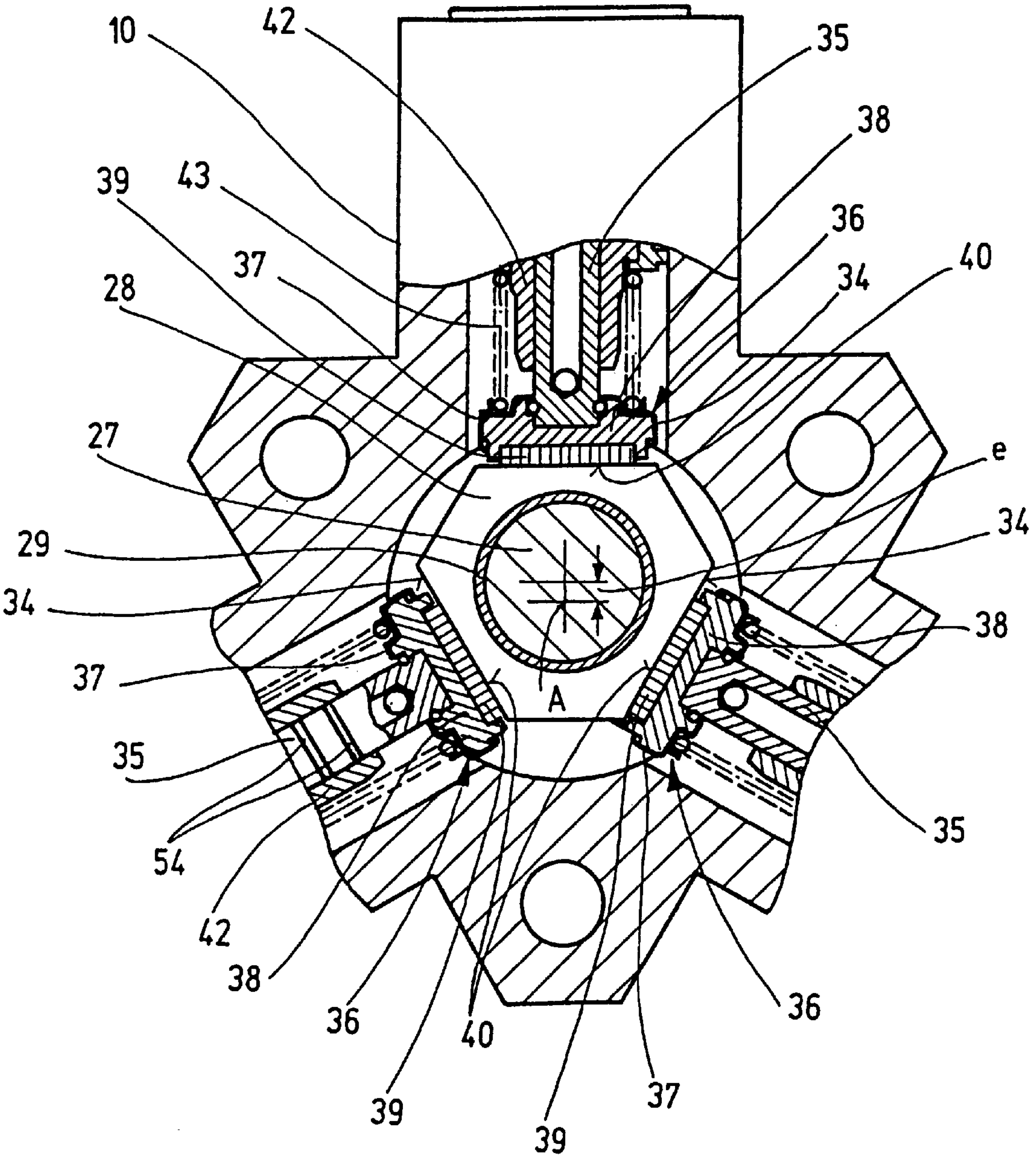
FIG. 2 is a partially sectional representation of the piston pump according to FIG. 1, in the plane of the pistons.

As shown in FIG. 1, a housing 10 of a preferably selected piston pump embodied according to the invention has a bearing section 11 and a pump section 12, which are connected to each other by means of screws 13, only one of which is shown. A drive shaft 14 is supported in the bearing section 11 by means of a roller bearing 15. The roller bearing 15 is constituted by an outer bearing ring 16 and the drive shaft 14, into which ball tracks 17 are ground for ball bearings 18 that serve as rolling bodies. In addition, end face seals 19 are provided between the outer bearing ring 16 and the drive shaft 14 so that the inner region of the roller bearing 15 is sealed.

A drive disk 21 for driving the drive shaft 14 is non-rotatably slid onto a shaft pin 20 protruding out of the housing 10 and carries a toothed ring 22.

A low pressure chamber 23 provided in the housing 10 is sealed in relation to the roller bearing 15 by means of an axial shaft seal 24. In order to drain medium that penetrates into the region between the axial shaft seal 24 and the roller bearing 15 during operation of the piston pump, a leakage fitting 25 is inserted in a sealed fashion into a corresponding opening 26 in the bearing section 11 of the housing 10.

An eccentric pin 27 is disposed as a crank element on the free end of the drive shaft 14 that extends into the low pressure chamber 23 and a stroke ring 28 is supported on this eccentric pin 27 by means of a bearing sleeve 29. On its end remote from the free end of the eccentric pin 27, the bearing sleeve 29 has a radial flange 30 with which it rests against a shoulder 31 of the drive shaft 14. In order to secure the stroke ring 28 and the bearing sleeve 29 axially on the eccentric pin 27, a support disk 32 is attached to the end face of the eccentric pin 27 by means of a securing bolt 33 or the like.

The bearing sleeve 29 supporting the stroke ring 28, which is comprised of metal, preferably steel, has a bearing surface comprised of plastic, preferably a thermoplastic, in particular a thermoplastic that serves as a solid lubricant. Although it is possible to manufacture the bearing sleeve 29 completely out of plastic, it is preferable according to the invention to provide a composite material for the bearing sleeve 29, preferably a metal/plastic composite material. PTFE (polytetrafluoroethylene), PTFE with lead as a filler, acetal copolymer, or a combination of PEEK (polyetheretherketone) and PTFE as well as a suitable filler can be provided as the plastic. The support disk 32 is preferably made of the same material as the bearing sleeve (29).

As shown in FIGS. 2 and 3*a* to 3*c*, the stroke ring 28 has smooth slide bearing surfaces 34, each of which supports a slide shoe 36 fastened to a piston 35. Each of the slide shoes 36 contains a body 38 fastened to the piston 35 by means of a clamp ring 37 and this body is attached to a sliding plate 39 that acts as a slide element and has a sliding surface 40 resting against the slide bearing surface 34.

Figure 3A:
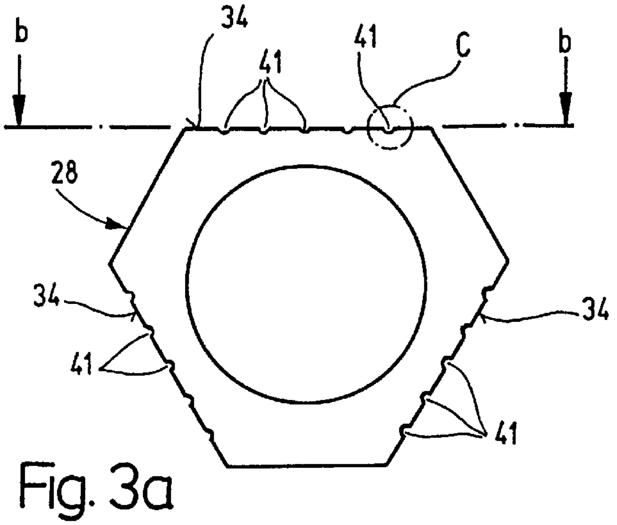
FIG. 3*a* is a top view of a stroke ring for a piston pump according to the invention.
Figure 3C:
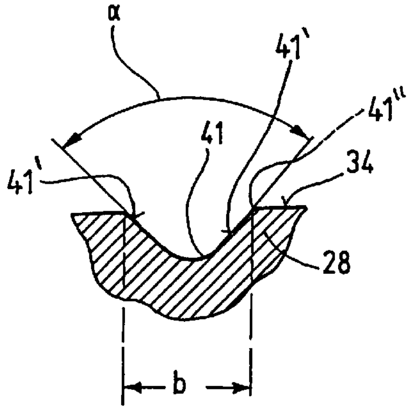
FIG. 3*c* is an enlarged representation of the region C in FIG. 3*a*.
Figure 3B:
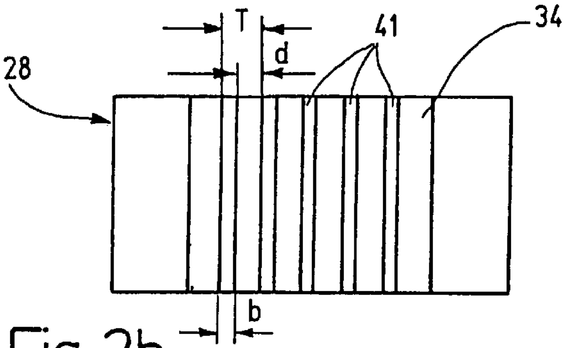
FIG. 3*b* is a top view of a slide bearing surface of the stroke ring in the direction of the arrow b in FIG. 3*a,*

A rotation of the drive shaft 14 produces a sliding motion between the slide shoe 36 and the stroke ring 28. As can be seen in FIGS. 3*a* to 3*c*, lubrication grooves 41 are provided in the slide bearing surfaces 34 of the stroke ring 28 and extend parallel to one another crosswise to the sliding direction of the slide motion. The cross section of the lubrication grooves 41 is essentially V-shaped. The opening angle $\alpha$ of the lubrication grooves 41 is approximately 90°.

The tip on the V-shaped cross section of the lubrication grooves 41 is rounded as well. Depending of the viscosity and lubrication capacity of a medium to be delivered, the lubrication grooves 41 can also have a smaller opening angle $\alpha$, but preferably have a larger one. The opening angle $\alpha$ can be up to approximately 120°. Consequently, a lubrication wedge, whose wedge angle is approximately 30° to 45°, can be formed between the flanks 41' and the slide shoe 36, not shown in FIGS. 3*a* and 3*c*.

The lubrication grooves 41, though, can also have a different cross section. Semicircular or arc-shaped cross sections with and without rounded edges are just as possible as sinusoid cross sections. In particular, it is suitable if the edges 41" of the lubrication grooves 41 are rounded so that the flanks 41' of the lubrication grooves 41 transition by way of the edges 41" essentially tangentially into the slide bearing surface 34. This permits an optimal lubrication wedge to be achieved.

The spacing d (see FIG. 3*b*) between the lubrication grooves 41 is at most equal to the piston stroke of the piston 35. Preferably, though, the partial mass T, which is comprised of the spacing d between the lubrication grooves 41 and the width b of the lubrication grooves 41, is less than or equal to the piston stroke. In order to obtain a favorable lubricating action with a sufficient percentage of contact area between the stroke ring 28 and the slide shoe 36, it is suitable to embody the width b of the lubrication grooves 41 as approximately half the size of the spacing d between the lubrication grooves 41.

While the body 38 of the slide shoe 36 is suitably comprised of metal, the slide plates contained in it are preferably comprised of plastic, in particular PEEK or polyimide. However, a slide plate 39 can also be used which is comprised of steel, which is provided with a metal free or metal containing carbon coating.

A coating of this kind produces an improvement of the surface hardness as well as a reduction of the sliding friction. In addition, the wettability of the surface is improved by a carbon coating so that a lubricating film comprised of the medium to be delivered can more easily form between the sliding surface 40 and the slide bearing surface 34. In lieu of the slide shoe 36 described, it is also possible to use a one-piece slide shoe 36' (FIG. 4), which is comprised of plastic or steel. With a one-piece slide shoe it is suitable to coat the sliding surface 40 with a metal containing or metal free carbon coating.

As is particularly clear in FIG. 1, the piston 35 guided in a piston guide 42 is pressed against the slide bearing surface 34 of the stroke ring 28 by a spring 43 that is supported on one end against the slide shoe 36 via the clamp ring 37 and on the other end, is supported against a securing part 44 into which the piston guide 42 is inserted. A work chamber 45 is provided in the securing part 44 and in the piston guide 42 and communicates with the low pressure chamber 23 via an inlet valve 46 connected to the piston 35, an axial inlet bore 47 provided in the piston 35, and inlet openings 48 disposed in the piston 35 when the piston 35 moves toward the drive shaft axis A during a rotation of the drive shaft 14. The work chamber 45 is delimited by a valve 52 in relation to a high pressure region 49, which communicates via a line 50 with a high pressure connection 51 of the piston pump. The inlet of medium to be delivered into the low pressure region 23 is carried out via corresponding inlet connections 53.

During the operation of the piston pump according to the invention, the eccentric pin 27 rotates with an eccentricity e around the drive shaft axis A and in so doing, sets the stroke ring 28 into a revolving motion around the drive shaft axis A. The stroke ring 28 does not carry out a rotating motion since it is non-rotatably secured via the slide shoes 36 that are present due the pistons 35. As a result of the revolving motion of the stroke ring 28, though, a sliding motion occurs between the slide surface 40 and the slide bearing surface 34 of the stroke ring 28. The sliding path of the sliding motion is twice as great in amount as the eccentricity e of the eccentric pin 27 and consequently equal to the amount of the piston stroke of the piston 35.

Since the lubrication grooves 41 in the slide bearing surface 34 of the stroke ring 28 are disposed at a spacing d, which is smaller than the piston stroke, i.e. at a spacing that is smaller than the sliding path of the slide shoe 36 in relation to the stroke ring 38, with each sliding motion, medium to be delivered from one of the lubrication grooves 41 in the slide bearing surface 34 can be carried along by the sliding surface 40 to the neighboring lubrication groove 41. Consequently, medium to be delivered travels into all of the regions between the slide bearing surface 34 and the slide surface 40, and a dry running of this slide bearing is reliably prevented.

Although it is preferable, as shown in FIGS. 3*a* and 3*b*, to embody the lubrication grooves 41 as lateral to the slide direction of the slide surface 40 on the slide bearing surface 34, the lubrication grooves 41 can also be disposed at an oblique angle in relation to the direction of the sliding motion.

Since the stroke ring 28 executes an oscillating sliding motion with its slide bearing surface 34 in relation to the piston 35 or the slide shoe 36, one-sided loadings of the piston guide 42 are prevented. In addition, the favorable sliding support of the slide shoe 36 on the stroke ring 28 significantly reduces lateral forces acting on the pistons 35. This can markedly reduce the wear and tear on the piston 35 and piston guide 42, which leads to a considerable lengthening of the service life of the piston pump according to the invention. In order to further reduce the wear and tear on the surfaces of the piston 35 and piston guide 42 that slide against each other and in order to reduce pressure fields possibly produced in this region, the piston 35 can be provided with circumferential grooves 54. Furthermore, it is also possible to coat the piston, which is preferably comprised of steel, with a metal containing or metal free carbon coating.

Figure 4:
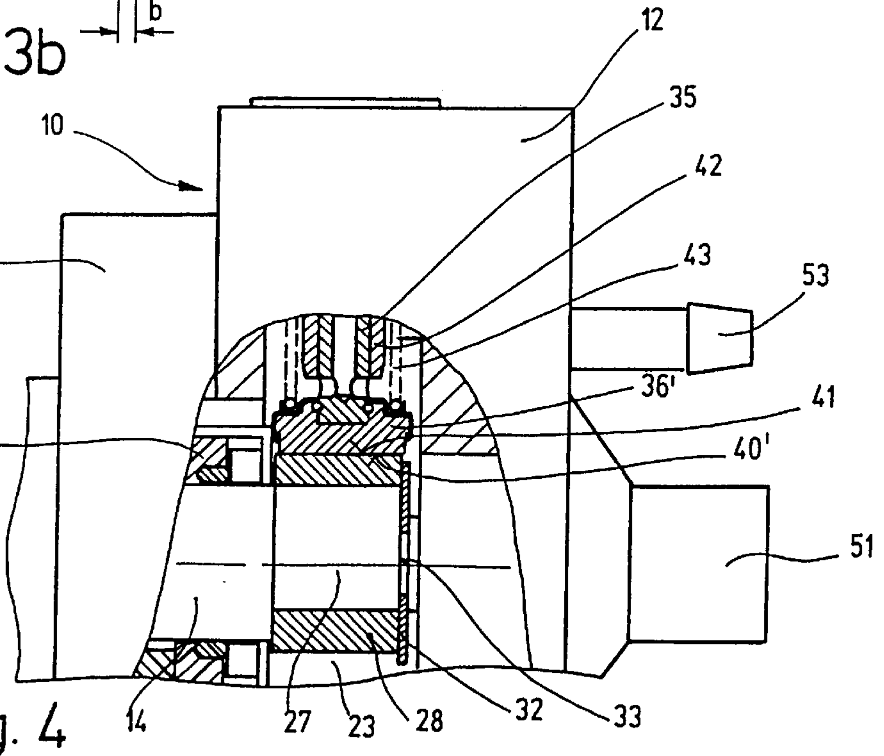
FIG. 4 is a partially sectional schematic representation of another piston pump according to the invention.

Another embodiment of the piston pump according to the invention shown in FIG. 4 has a one-piece slide shoe 36', which cooperates with a stroke ring 28 supported directly on the eccentric pin 27 of the drive shaft 14. The stroke ring 28 is suitably comprised of plastic, in particular of a high temperature resistant thermoplastic, preferably of PEEK or polyimide. The slide shoe 36' in this case is suitably comprised of steel, wherein its sliding surface 40' can be coated with a carbon coating. The carbon coating, which serves to improve friction, can be metal free or can contain metal.

Corrosion problems that can arise with a stroke ring made of metal are prevented through the use of the stroke ring 28 comprised of PEEK or polyimide. Since the preferable plastics are low-friction, at the same time, a bearing sleeve between the eccentric pin 27 and the stroke ring 28 can be eliminated, which further simplifies the design of the piston pump according to the invention.

The foregoing relates to preferred exemplary embodiments of the invention, it being understood that other variants and embodiments thereof are possible within the spirit and scope of the invention, the latter being defined by the appended claims.

We claim:

1. A high pressure piston pump for a fuel injection device of an internal combustion engine, comprising at least one piston that is supported so that the piston can slide in a piston guide provided in a housing, a drive shaft supported in the housing on which a crank element is provided, a stroke ring that is supported in rotary fashion on the crank element, the piston can be acted upon by the drive shaft by way of said stroke ring, the piston (35) is supported on the non-rotating stroke ring (28) with a sliding surface (40) disposed on the stroke ring against an associated slide bearing surface (34), wherein lubrication grooves (41) are let into the slide bearing surface (34), essentially crosswise to the relative motion between the piston (35) and the stroke ring (28).

2. A piston pump according to claim 1, in which a spacing (d) of the lubrication grooves (41), are provided essentially parallel to one another in the smooth slide bearing surface (34), said grooves are smaller than the piston stroke of the piston (35).

3. A piston pump according to claim 2, in which a partial mass (T) of the lubrication grooves (41) provided in the slide bearing surface (34) is less than or equal to the piston stroke of the piston (35).

4. A piston pump according to claim 1, in which the edges (41") of the lubrication grooves (41) are rounded.

5. A piston pump according to claim 2, in which the edges (41") of the lubrication grooves (41) are rounded.

6. A piston pump according to claim 3, in which the edges (41") of the lubrication grooves (41) are rounded.

7. A piston pump according to claim 1, in which the stroke ring (28) is comprised of metal, and is supported on the crank element (27) via a bearing sleeve (29) with a bearing surface made of plastic which serves as a solid lubricant.

8. A piston pump according to claim 2, in which the stroke ring (28) is comprised of metal, and is supported on the crank element (27) via a bearing sleeve (29) with a bearing surface made of plastic which serves as a solid lubricant.

9. A piston pump according to claim 3, in which the stroke ring (28) is comprised of metal, and is supported on the crank element (27) via a bearing sleeve (29) with a bearing surface made of plastic which serves as a solid lubricant.

10. A piston pump according to claim 4, in which the stroke ring (28) is comprised of metal, and is supported on the crank element (27) via a bearing sleeve (29) with a bearing surface made of plastic which serves as a solid lubricant.

11. A piston pump according to claim 7, in which the bearing sleeve (29) for the stroke ring (28) is comprised of a metal/plastic composite material.

12. A piston pump according to claim 1, in which the stroke ring (28) is comprised of a high temperature resistant polymer plastic, selecting from a group comprising polyamide or PEEK.

13. A piston pump according to claim 2, in which the stroke ring (28) is comprised of a high temperature resistant polymer plastic, selecting from a group comprising polyamide or PEEK.

14. A piston pump according to claim 1, in which the sliding surface (40) disposed on the piston (35) is provided on a slide shoe (36, 36') affixed to said piston.

15. A piston pump according to claim 2, in which the sliding surface (40) disposed on the piston (35) is provided on a slide shoe (36, 36') affixed to said piston.

16. A piston pump according to claim 1, in which the sliding surface (40) disposed on the piston (35) is comprised of a carbon coated steel.

17. A piston pump according to claim 14, in which the sliding surface (40) disposed on the piston (35) is provided on a sliding element (39) affixed to the slide shoe (36).

18. A piston pump according to claim 17, in which the slide element (39) is comprised of a high temperature resistant polymer plastic, selecting from a group comprising polyamide or PEEK.

19. A piston pump according to claim 1, in which the piston (35) has circumferential grooves (54) disposed in its outer circumference surface.

20. A piston pump according to claim 1, in which the outer circumference surface of the piston (35) has a carbon coating.

* * * * *